(12) United States Patent
Lin (10) Patent No.: US 11,773,903 B2
(45) Date of Patent: Oct. 3, 2023

(54) LINEAR GUIDEWAY WITH LUBRICATING STRUCTURE

(71) Applicant: HIWIN TECHNOLOGIES CORP., Taichung (TW)

(72) Inventor: Jian-Ting Lin, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 0 days.

(21) Appl. No.: 17/550,207

(22) Filed: Dec. 14, 2021

(65) Prior Publication Data

US 2023/0184290 A1 Jun. 15, 2023

(51) Int. Cl.
*F16C 29/06* (2006.01)
*F16C 33/66* (2006.01)

(52) U.S. Cl.
CPC ...... *F16C 29/0607* (2013.01); *F16C 29/0611* (2013.01); *F16C 29/0657* (2013.01); *F16C 33/6648* (2013.01)

(58) Field of Classification Search
CPC .............. F16C 29/0602; F16C 29/0607; F16C 29/0611; F16C 29/064; F16C 29/0652; F16C 29/0654; F16C 29/0657; F16C 29/0669; F16C 29/0671; F16C 29/0673; F16C 33/6607; F16C 33/6611; F16C 33/664; F16C 33/6648
See application file for complete search history.

(56) References Cited

U.S. PATENT DOCUMENTS

| | | | |
|---|---|---|---|
| 5,570,958 A * | 11/1996 | Tsukada | F16C 29/0611 384/13 |
| 6,290,394 B1 | 9/2001 | Ohara et al. | |
| 7,234,867 B2 * | 6/2007 | Ishihara | F16C 29/0611 384/45 |
| 8,783,951 B2 | 7/2014 | Kondo | |

FOREIGN PATENT DOCUMENTS

| | | |
|---|---|---|
| CN | 104024669 A | 3/2017 |
| DE | 102007012746 A1 | 9/2008 |
| EP | 2518349 A2 | 10/2012 |

(Continued)

OTHER PUBLICATIONS

Translation of EP2518349 obtained Apr. 1, 2023.*

*Primary Examiner* — James Pilkington
(74) *Attorney, Agent, or Firm* — Muncy, Geissler, Olds & Lowe, P.C.

(57) ABSTRACT

A linear guideway includes a rail, a sliding block with two foot members, a circulating member with two receiving chambers, two sets of balls and two lubricating plates. The receiving chambers of the circulating member receive the foot members of the sliding block respectively, so that the rail, each foot member of the sliding block and the circulating member form a circulation channel for one respective set of balls to run. The two lubricating plates are adjacent to the two circulation channels and contact the two sets of balls to provide lubrication to the balls. In this way, the linear guideway conceals two lubricating plates in the sliding block, which can maintain the length of the sliding block without affecting the stroke, and ensure that the running path (Continued)

does not produce a step difference, so that the smooth running of the ball can be kept consistent.

8 Claims, 13 Drawing Sheets

(56) References Cited

FOREIGN PATENT DOCUMENTS

| | | | |
|---|---|---|---|
| JP | H03292412 | A | 12/1991 |
| JP | 2003172352 | A | 6/2003 |
| JP | 2006046432 | A | 2/2006 |
| JP | 2014142014 | A | 8/2014 |
| JP | 2015222112 | A | 12/2015 |

* cited by examiner

LINEAR GUIDEWAY WITH LUBRICATING STRUCTURE

BACKGROUND OF THE INVENTION

1. Field of the Invention

The present invention relates to linear guideway technology and more particularly, to a linear guideway with a built-in lubricating structure.

2. Description of the Related Art

For the miniature linear slide, the fuel tank is usually set externally at one end of the sliding block. However, this kind of external structure will cause the overall length of the sliding block to become longer and affect the stroke of the sliding block. In addition, under short-stroke operating conditions, the lubricating oil cannot provide sufficient lubrication effect, which leads to the risk of product failure.

The technology disclosed in the U.S. Pat. No. 8,783,951 is to set two porous lubrication tubes between the sliding block and the circulating member, and when the balls pass, they can be squeezed by the balls to release the lubricating oil. However, there is a step difference between the porous lubrication tubes and the return path, which will affect the smooth running of the balls. In addition, the aforementioned porous lubrication tubes are set on the non-load side. Under short-stroke operating conditions, the balls on the load side cannot obtain sufficient lubrication, which easily leads to premature product failure.

The technology disclosed in the U.S. Pat. No. 6,290,394 is to add a lubricating plate to the end cover, which causes the overall length of the sliding block to become longer, which in turn affects the stroke of the sliding block. In addition, under short-stroke operating conditions, the lubricating oil cannot be completely applied to the track, which makes it difficult to obtain sufficient lubrication on the load surface, which easily leads to premature failure of the product.

The technology disclosed in the CN 104024669 is to place a U-shaped lubricating plate on the abdomen of the sliding block, and the two ends of the U-shaped lubricating plate are in contact with the balls, so that the balls are lubricated. However, there is a step difference between the aforementioned U-shaped lubricating plate and the return path, and the configuration of the U-shaped lubricating plate is relatively thin, resulting in easy damage when being impacted by the balls. To increase the structural strength, it is necessary to further reduce the content of lubricant, which will result in a reduction in service life.

SUMMARY OF THE INVENTION

The present invention has been accomplished under the circumstances in view. It is the main object of the present invention to provide a linear guideway with lubricating structure, which provides sufficient lubrication effect under short-stroke operating conditions and keeps the smooth running of the balls consistent.

In order to achieve the above main object, the linear guideway with lubricating structure of the present invention comprises a rail, a sliding block, a circulating member, two sets of balls, and two lubricating plates. The sliding block can be slidably arranged on the rail, and the bottom surface of the sliding block has two relatively disposed foot members, and the foot members are located on two opposite sides of the rail. The circulating member is slidably set on the rail and connected to the sliding block. The circulating member comprises two opposite receiving chambers. The receiving chambers of the circulating member receive the foot members of the sliding block respectively, so that the rail, each foot member of the sliding block and the circulating member form a respective circulating channel. Each set of balls is set in one respective circulation channel. The two lubricating plates are adjacent to the two circulation channels and contact the two sets of balls to provide lubrication to the balls.

It can be seen from the above that the linear guideway with lubricating structure of the present invention hides the lubricating plates in the sliding block. Not only can the existing length of the sliding block be maintained, so that the stroke of the sliding block will not be affected, and it is quite suitable for use under short-stroke operating conditions. Moreover, the lubricating plates keep in contact with the balls during the operation of the balls. In this way, there will be no step difference in the running path of the balls, so that the smoothness of the balls can be kept consistent.

Preferably, the lubricating plates can selectively contact the top or bottom of the balls, and the lubricating plates can also contact the top and bottom of the balls.

Preferably, each lubricating plate comprises a positioning post, and the circulating member has a positioning hole. Each lubricating plate is inserted into one respective positioning hole of the circulating member with the positioning post to facilitate the assembly and positioning of each lubricating plate.

Preferably, each lubricating plate comprises a socket groove. Each lubricating plate is sleeved on one respective foot member of the sliding block with the socket groove to complete the assembly.

Preferably, each lubricating plate comprises a covering portion adjacent to the socket groove. Each lubricating plate covers a part of the balls with the covering portion, so that each lubricating plate can more reliably provide a lubricating effect to the balls.

Preferably, each lubricating plate contacts the bottom of the balls with a plane to provide a lubricating effect to the balls.

Preferably, the rail comprises two parallel first rolling grooves. Each foot member of the sliding block comprises two parallel second rolling grooves and two opposite first return grooves. Each first return groove is connected to one end of each second rolling groove. The circulating member comprises two opposite receiving chambers, two third rolling grooves and two opposite second return grooves around each receiving chamber. The second return grooves are connected to two ends of the third rolling groove respectively. One second rolling groove of each foot member of the sliding block corresponds to one respective first rolling groove of the rail, and the second rolling groove of each foot member of the sliding block corresponds to one respective third rolling groove of the circulating member, and the first return grooves of the foot members of the sliding block correspond to the second return grooves of the circulating member, so that one first rolling groove, the second rolling grooves, one third rolling groove, the first return grooves and the second return grooves together form one respective circulation channel.

Preferably, the rail comprises two parallel first rolling grooves. Each foot member of the sliding block comprises two parallel second rolling grooves. The circulating member comprises two opposite receiving chambers, two third rolling grooves, two opposite second return grooves and two opposite first half return portions set around each receiving chamber. The second return grooves are respectively connected to two ends of the third rolling groove. Each first half return portion is adjacent to one respective second return groove. Each lubricating plate comprises a socket groove and two opposite second half return portions. Each second half return portion is adjacent to one end of the socket groove. One second rolling groove of each foot member of the sliding block corresponds to one respective first rolling groove of the rail. The other second rolling groove of each foot member of the sliding block corresponds to one respective third rolling groove of the circulating member, and the first half return portions of the circulating member are connected with the second half return portions of the lubricating plates to form the first return grooves. The first return grooves correspond to the second return grooves of the circulating member so that one first rolling groove, the second rolling grooves, one third rolling grooves, the first return grooves and the second return grooves together form one respective circulation channel.

Preferably, each lubricating plate is made of a porous material, so that each lubricating plate has a good oil storage capacity.

The detailed structure, features, assembly or use of the linear guideway with lubricating structure provided by the present invention will be described in the detailed description of the subsequent implementation. However, those with ordinary knowledge in the field of the present invention should be able to understand that these detailed descriptions and specific embodiments listed in the implementation of the present invention are only used to illustrate the present invention, and are not intended to limit the scope of the patent application of the present invention.

DETAILED DESCRIPTION OF THE INVENTION

The applicant first explains here that throughout the specification, including the embodiments described below and the claims in the scope of the patent application, the nouns related to directionality are based on the directions in the drawings. Secondly, in the embodiments and drawings that will be introduced below, the same element numbers represent the same or similar elements or their structural features.

Figure 1:
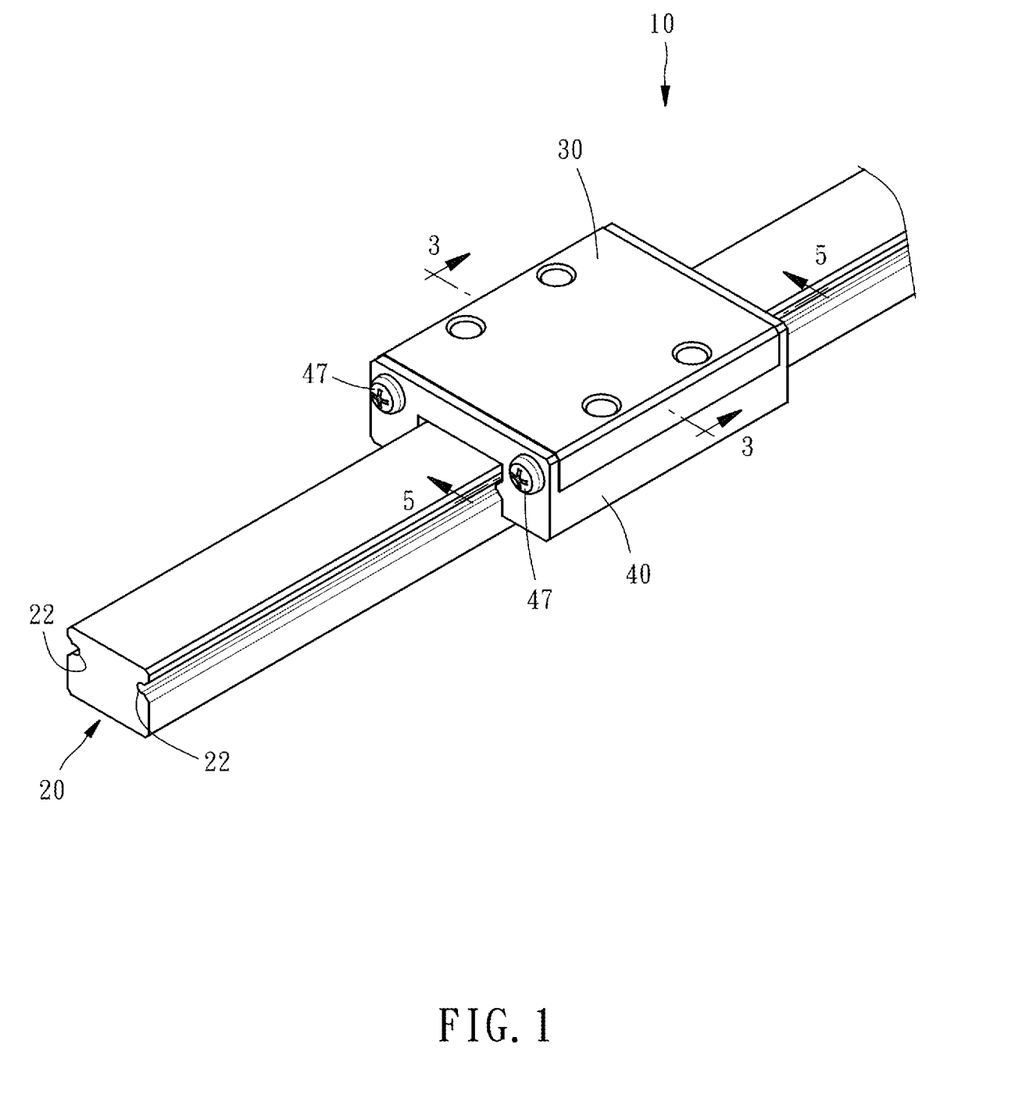
FIG. 1 is an elevational view of the linear guideway with lubricating structure of the first embodiment of the present invention.
Figure 2:
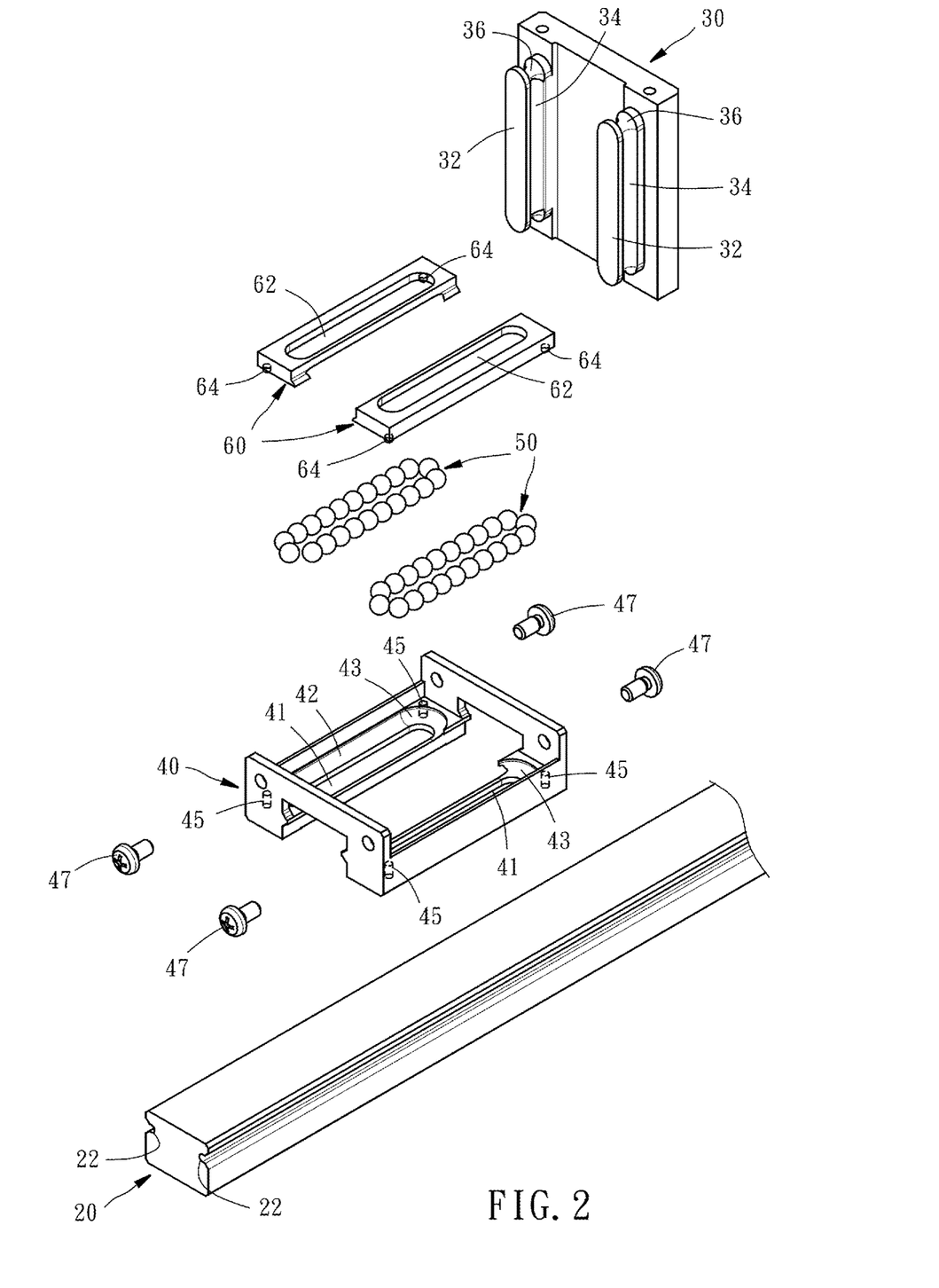
FIG. 2 is an exploded view of the linear guideway with lubricating structure of the first embodiment of the present invention.

Referring to FIG. 1 and FIG. 2, the linear guideway 10 with lubricating structure according to the first embodiment of the present invention comprises a rail 20, a sliding block 30, a circulating member 40, two sets of balls 50, and two lubricating plates 60.

The two opposite sides of the rail 20 respectively have a first rolling groove 22 extending along its length.

Figure 3:
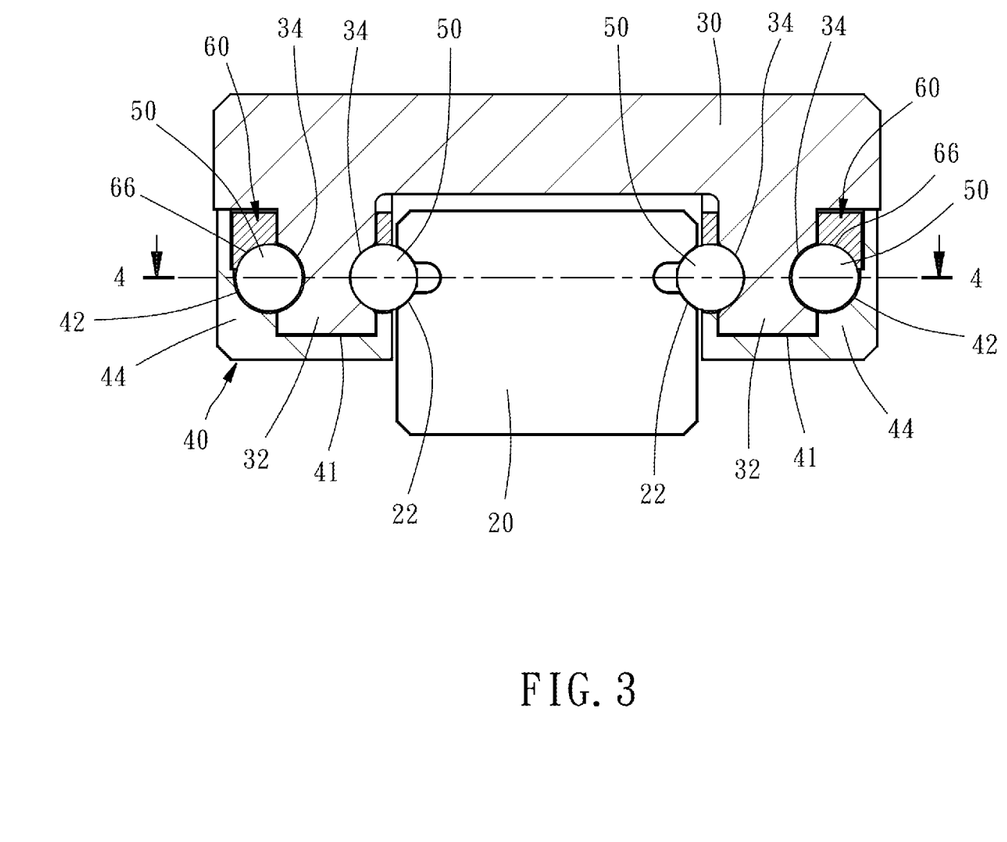
FIG. 3 is a sectional view taken along line 3-3 of FIG. 1.
Figure 4:
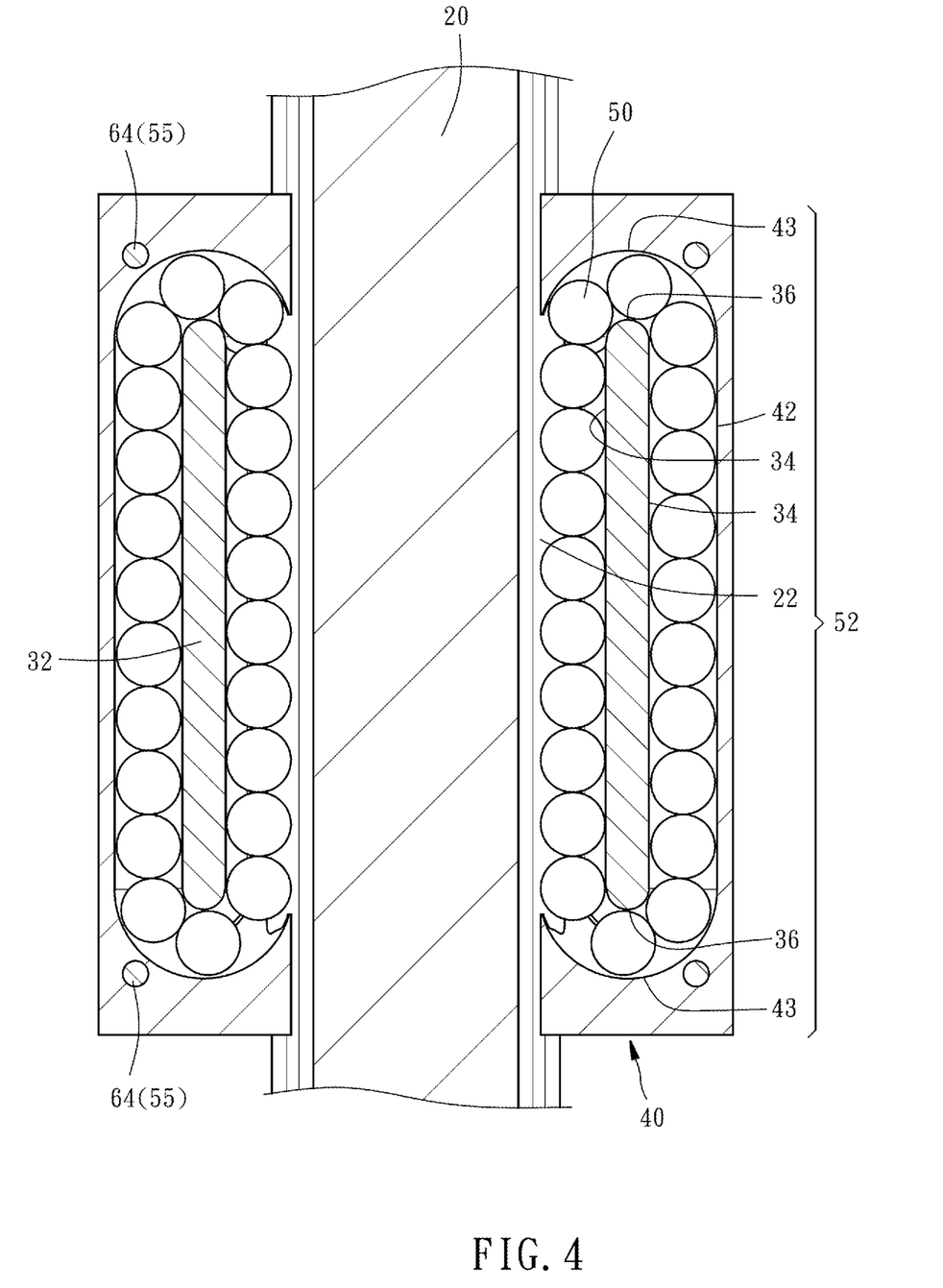
FIG. 4 is a sectional view taken along line 4-4 of FIG. 1.

The bottom surface of the sliding block 30 is provided with two oppositely arranged foot members 32, and each of the foot members 32 has two parallel second rolling grooves 34 and two oppositely arranged first return grooves 36. Each first return groove 36 connects one end of each of the two second rolling grooves 34. As shown in FIG. 3 and FIG. 4, the sliding block 30 is straddled above the rail 20, so that the two foot members 32 are located on opposite sides of the rail 20, and one second rolling groove 34 of each of the two foot members 32 corresponds to the two first rolling grooves 22 of the rail 20.

Figure 5:
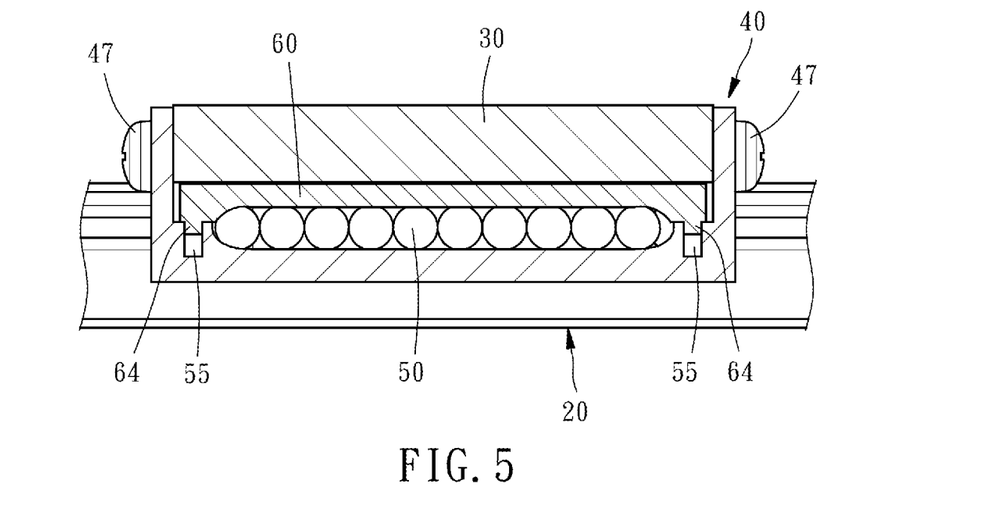
FIG. 5 is a sectional view taken along line 5-5 of FIG. 1.

The circulating member 40 comprises two relatively disposed receiving chambers 41 located on a top surface thereof, and two third rolling grooves 42 and two relatively disposed second return grooves 43 set around each receiving chamber 41. The third rolling groove 42 is located on a bulge 44 adjacent to the receiving chamber 41. The two second return grooves 43 connect to the two ends of the third rolling groove 42. The circulating member 40 also comprises four positioning holes 45 located on the top surface (see FIG. 2). The positioning holes 45 are respectively adjacent to the second return grooves 43. As shown in FIGS. 3-5, the circulating member 40 is located above the rail 20, and opposing front and rear sides of the circulating member 40 are fastened to the sliding block 30 with two screws 47 respectively, so that the circulating member 40 and the sliding block 30 can slide along the rail 20 together.

In addition, the two receiving chambers 41 of the circulating member 40 accept the two foot members 32 of the sliding block 30, on the one hand, the two third rolling grooves 42 of the circulating member 40 correspond to the other second rolling groove 34 of each of the two foot members 32 of the sliding block 30, on the other hand, the second return grooves 43 of the circulating member 40 correspond to the first return grooves 36 of the two foot members 32 of the sliding block 30. Thus, as shown in FIG.

4, the first rolling grooves 22, the second rolling grooves 34, the third rolling grooves 42, the first return grooves 36 and the second return grooves 43 respectively constitute two circulation channels 52. Each circulation channel 52 is provided for one respective set of balls 50 to run.

Figure 6:
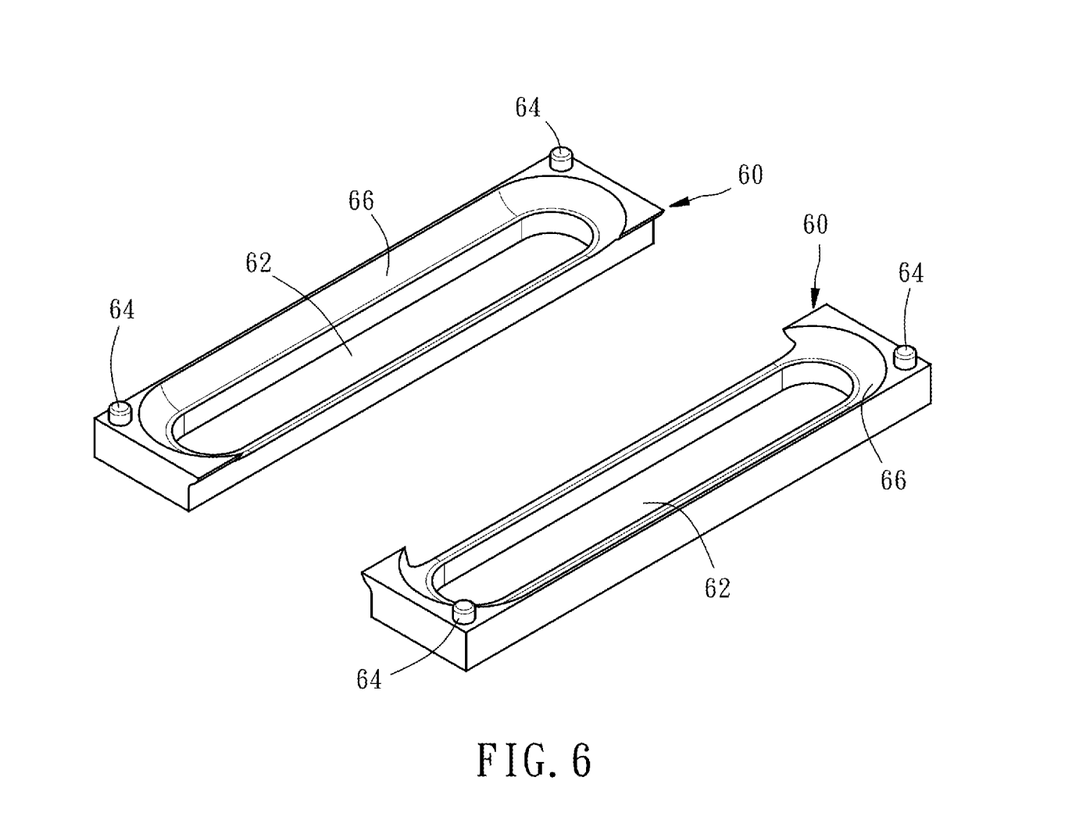
FIG. 6 is an elevational view of the lubricating plate provided by the linear guideway with lubricating structure of the first embodiment of the present invention after being turned over.

The lubricating plates 60 are made of porous materials, such as polymer materials, polyolefins, paraffin wax or high-density fibrous bodies. In this embodiment, each lubricating plate 60 has a socket groove 62 that penetrates the top and bottom surfaces, and the two ends of the bottom surface of each lubricating plate 60 respectively have a positioning post 64. As shown in FIGS. 3-5, the lubricating plates 60 are adjacently arranged on the circulation channel 52 and contact the top of the two sets of balls 50, and are respectively sleeved on the foot members 32 of the sliding block 30 with socket grooves 62. In addition, the positioning posts 64 are inserted into the positioning holes 45 of the circulating member 40 to complete the assembly of the lubricating plates 60, so that the lubricating plates 60 provide a lubricating effect to the balls 50. In addition, as shown in FIG. 6, the bottom surface of each lubricating plate 60 further has an arc-shaped covering portion 66 adjacent to the socket groove 62. Each lubricating plate 60 covers a part of each of the balls 50 with the covering portion 66, so that each lubricating plate 60 can provide a lubricating effect to the balls 50 more reliably.

Figure 7:
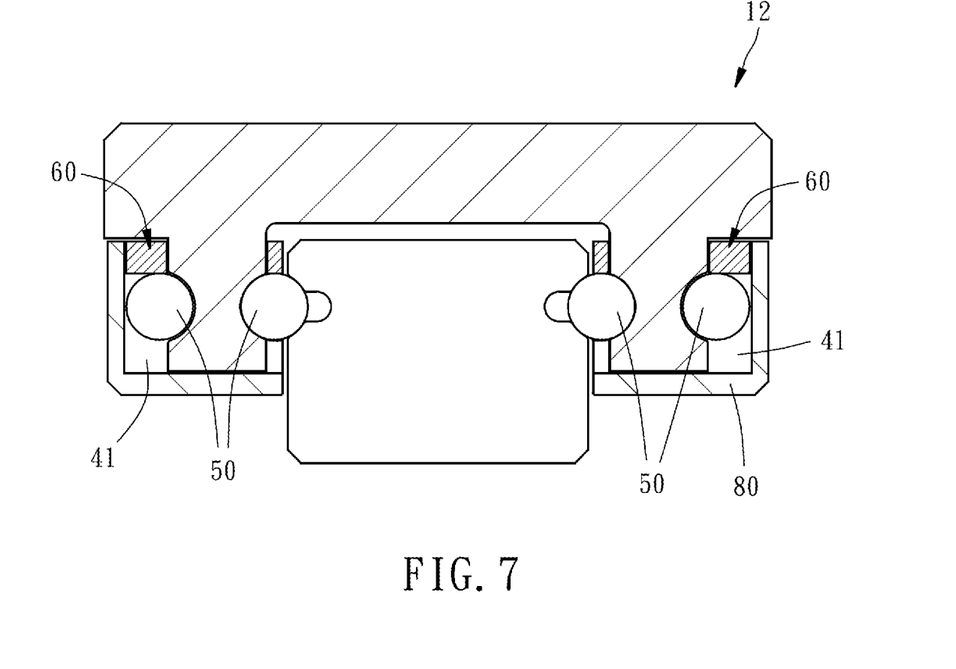
FIG. 7 is a cross-sectional view of the linear guideway with lubricating structure of the second embodiment of the present invention, which mainly shows that the lubricating plates are in contact with the top of the balls.
Figure 8:
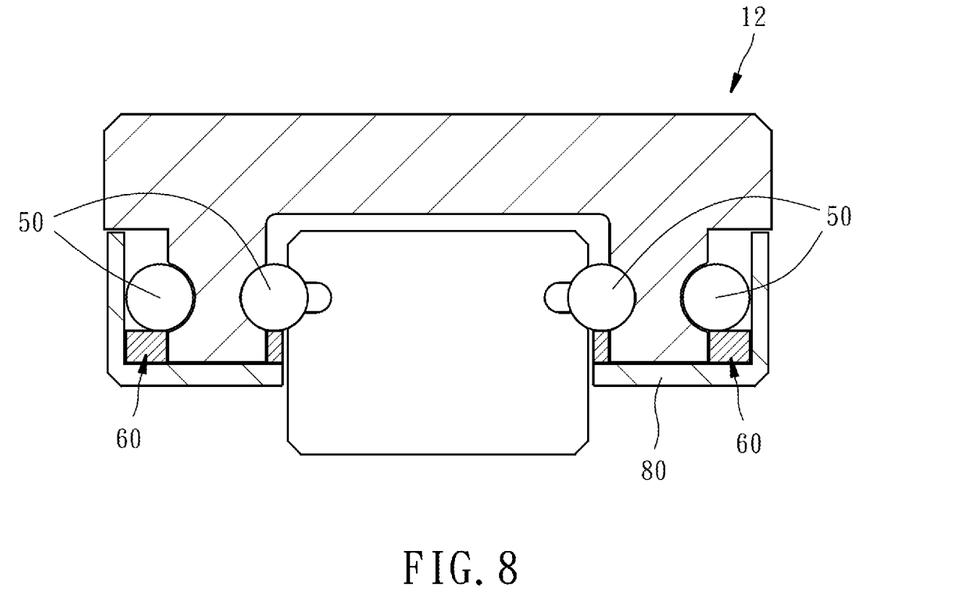
FIG. 8 is similar to FIG. 7, mainly showing that the lubricating plates are in contact with the bottom of the balls.
Figure 9:
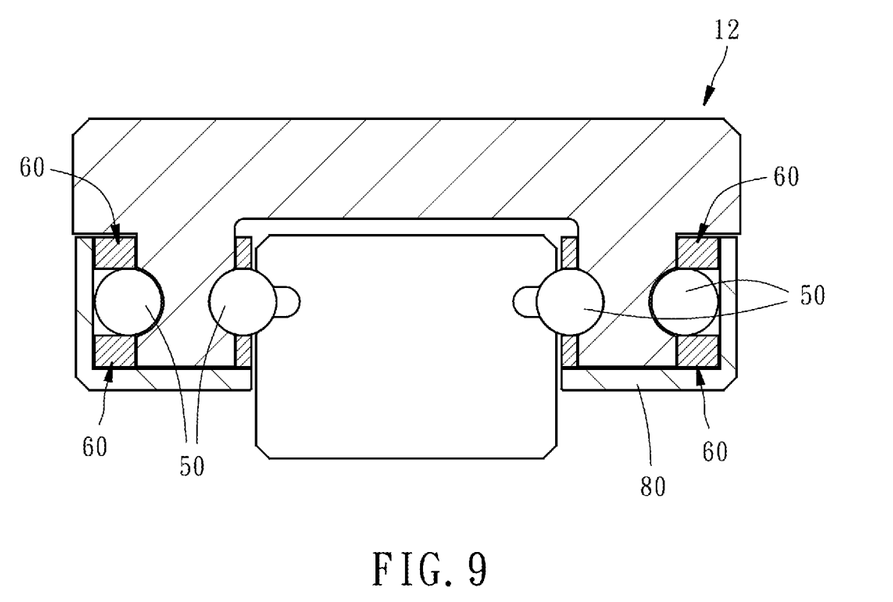
FIG. 9 is similar to FIG. 7, mainly showing that the lubricating plates are in contact with the top and bottom of the balls.

Referring to FIG. 7 and FIG. 8, the linear guideway 12 with lubricating structure according to the second embodiment of the present invention. The difference of the circulating member 80, is that the lubricating plates 60 can contact the top or bottom of the balls 50 according to actual needs. In detail, the circulating member 80 omits the setting of the bulge 44 in this embodiment, which increases the width of the receiving chamber 41. In this way, the lubricating plates 60 can not only contact the top of the balls 50 (as shown in FIG. 7) like the above embodiment, but also can be arranged in the receiving chambers 41 and contact the bottom of the balls 50 (as shown in FIG. 8). It is even possible to provide a respective lubricating plate 60 on the opposing top and bottom of the balls 50, so that the lubricating plates 60 are in contact with the top and bottom of the balls 50 at the same time (as shown in FIG. 9).

Figure 10:
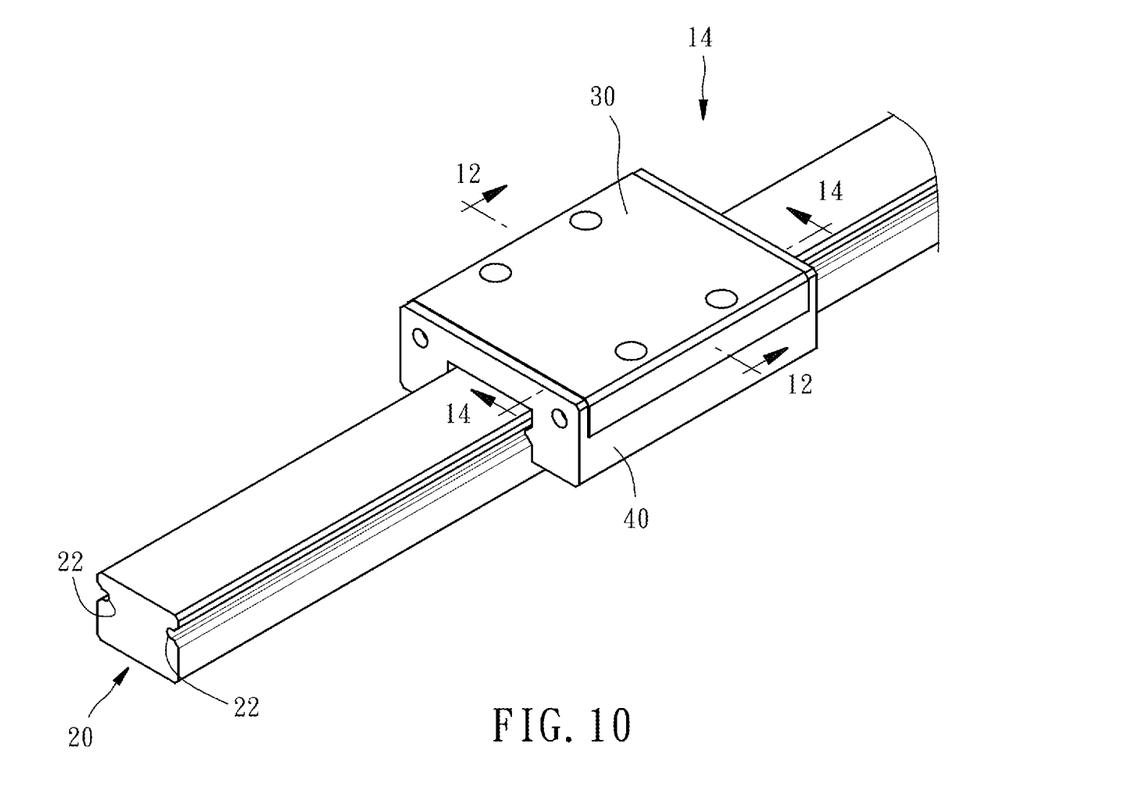
FIG. 10 is an elevational view of the linear guideway with lubricating structure of the third embodiment of the present invention.
Figure 11:
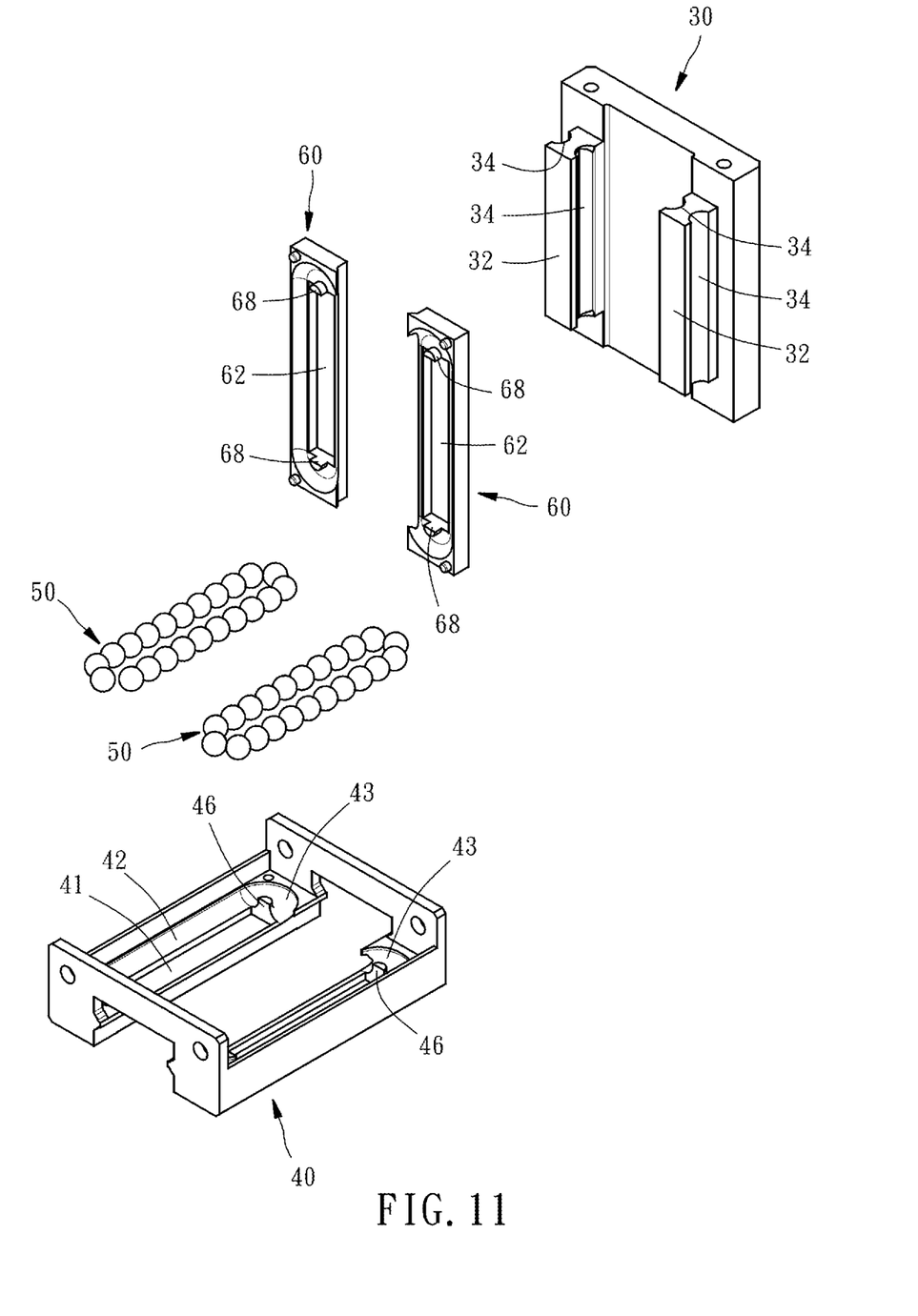
FIG. 11 is an exploded view of the linear guideway with lubricating structure of the third embodiment of the present invention.
Figure 12:
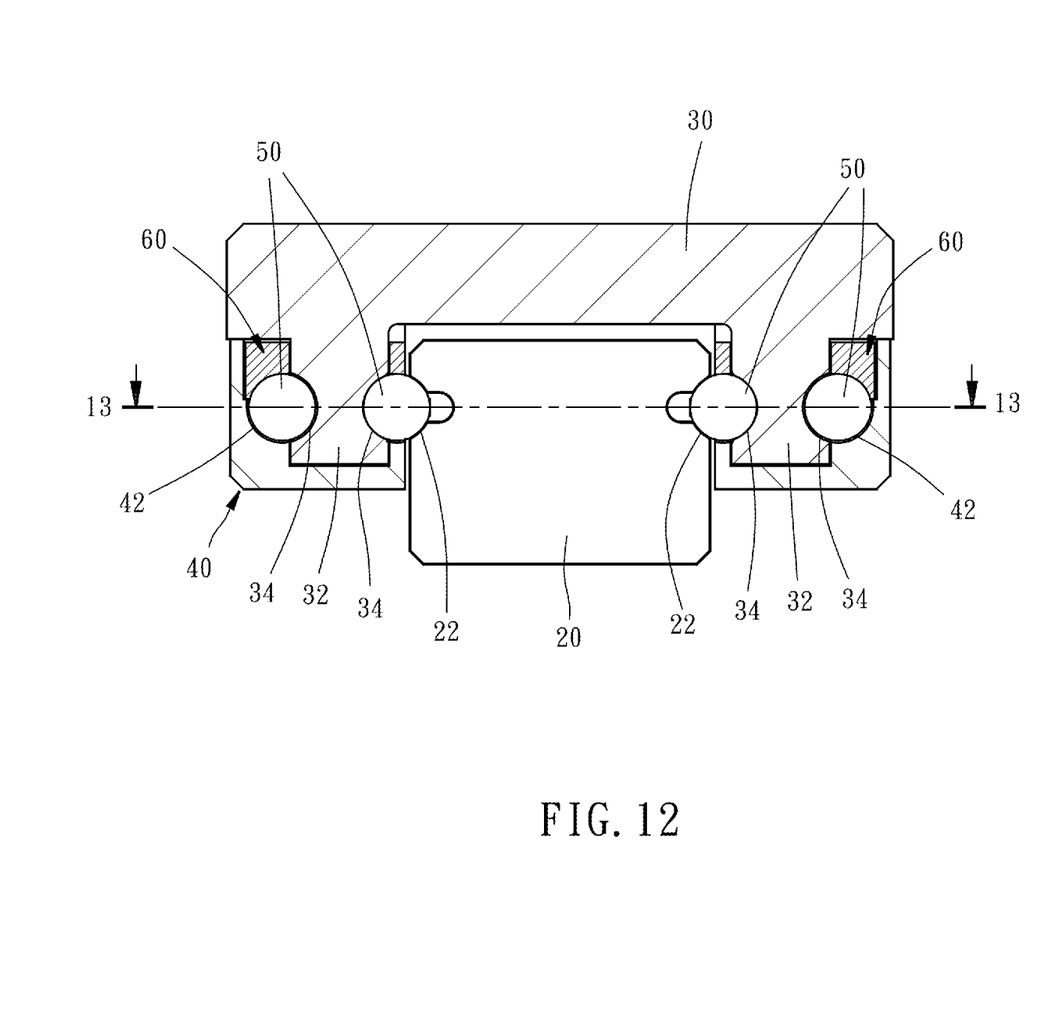
FIG. 12 is a sectional view taken along line 12-12 of FIG. 10.
Figure 13:
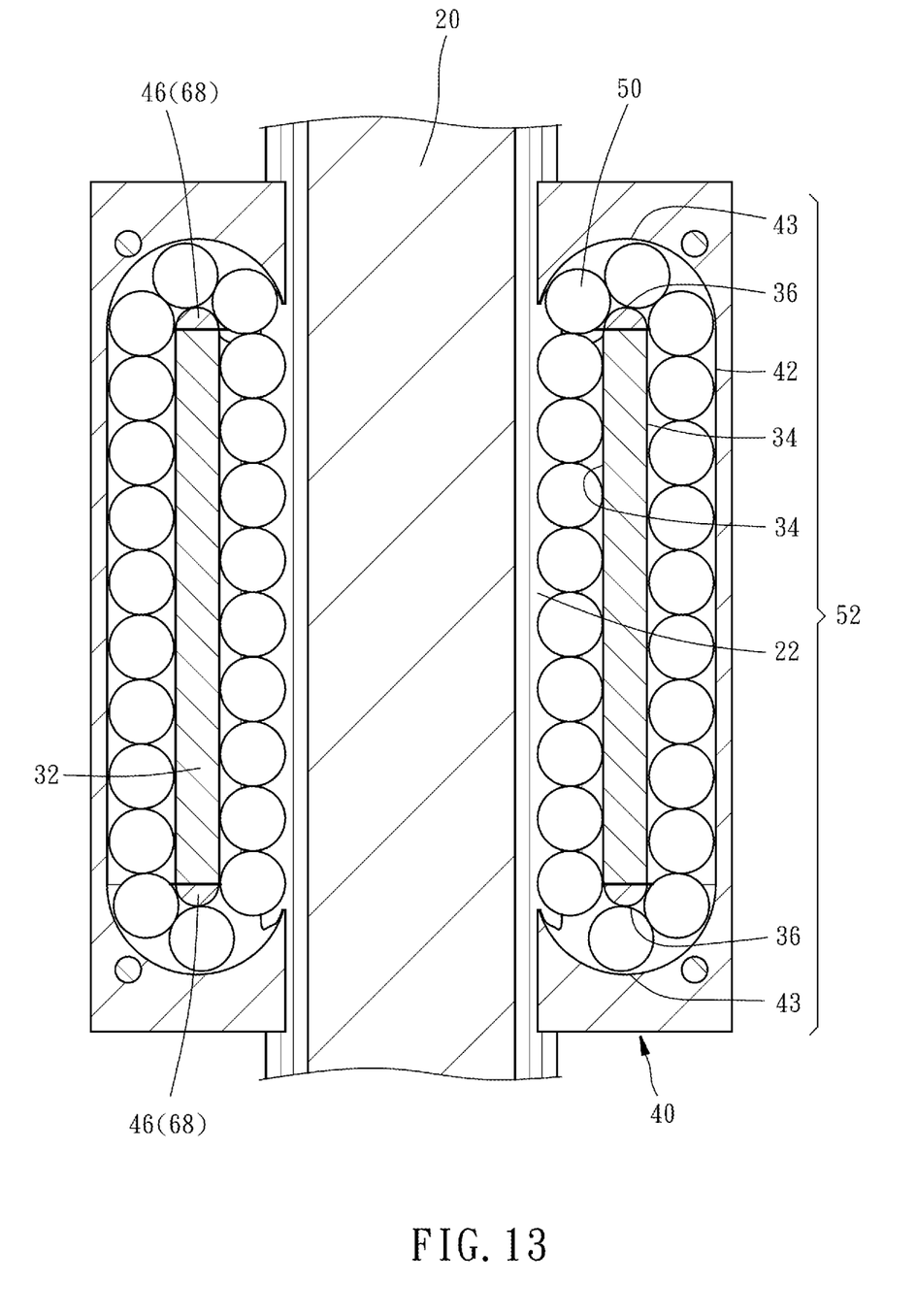
FIG. 13 is a sectional view taken along line 13-13 of FIG. 12.
Figure 14:
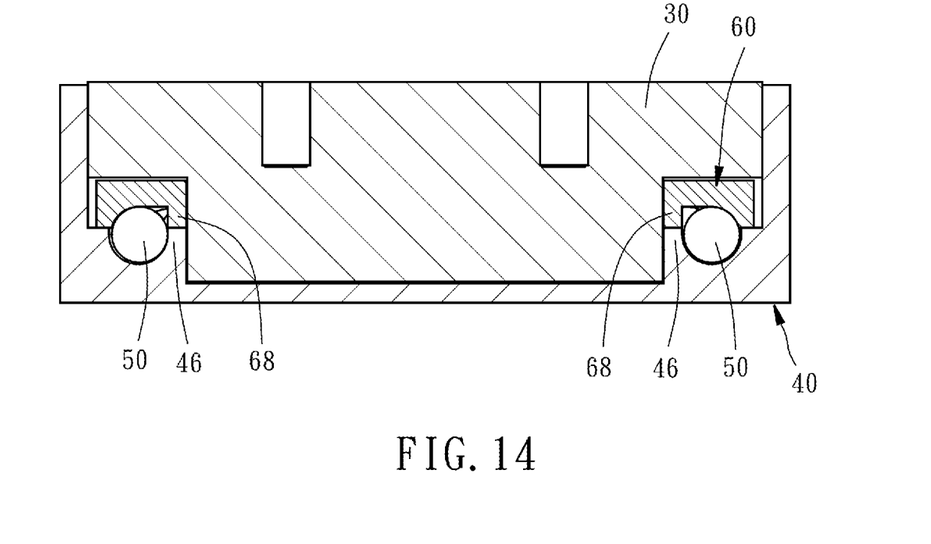
FIG. 14 is a sectional view taken along line 14-14 of FIG. 10.

Referring to FIG. 10 and FIG. 11, the linear guideway 14 with lubricating structure according to the third embodiment of the present invention. The main difference is that the two first return grooves 36 originally set in each foot member 32 of the sliding block 30 are set between the circulating member 40 and the two lubricating plates 60 in this embodiment. In this way, the effect of convenient processing of the sliding block 30 can be achieved. Furthermore, the rail 20 comprises two first rolling grooves 22 that are parallel to each other. Each foot member 32 of the sliding block 30 comprises two second rolling grooves 34 that are parallel to each other. The top surface of the circulating member 40 is provided with two opposite receiving chambers 41, two third rolling grooves 42, two opposite second return grooves 43 and two opposite first half return portions 46 around each receiving chamber 41. These second return grooves 43 connect to the two ends of the third rolling groove 42. The first half return portions 46 are adjacent to the second return grooves 43. The bottom surface of each lubricating plate 60 is provided with two opposite second half return portions 68. The second half return portions 68 are adjacent to the two ends of the socket groove 62. As shown in FIGS. 12-14, the second rolling grooves 34 of the foot members 32 of the sliding block 30 correspond to the first rolling grooves 22 of the rail 20 and the third rolling grooves 42 of the circulating member 40, and the first half return portions 46 of the circulating member 40 are connected to the second half return portions 68 of the lubricating plate 60 to form the first return grooves 36. The first return grooves 36 correspond to the second return grooves 43 of the circulating member 40. Thereby, the first rolling grooves 22, the second rolling grooves 34, the third rolling grooves 42, the first return grooves 36 and the second return grooves 43 together form two circulation channels 52, and each circulation channel 52 is provided to one respective set of balls 50 to run. In addition, in this embodiment, the lubricating plates 60 are also arranged adjacent to the circulation channels 52 and contact the top of the two sets of balls 50, and the socket grooves 62 are respectively set on the foot members 32 of the sliding block 30, to provide a lubricating effect to the balls 50.

Figure 15:
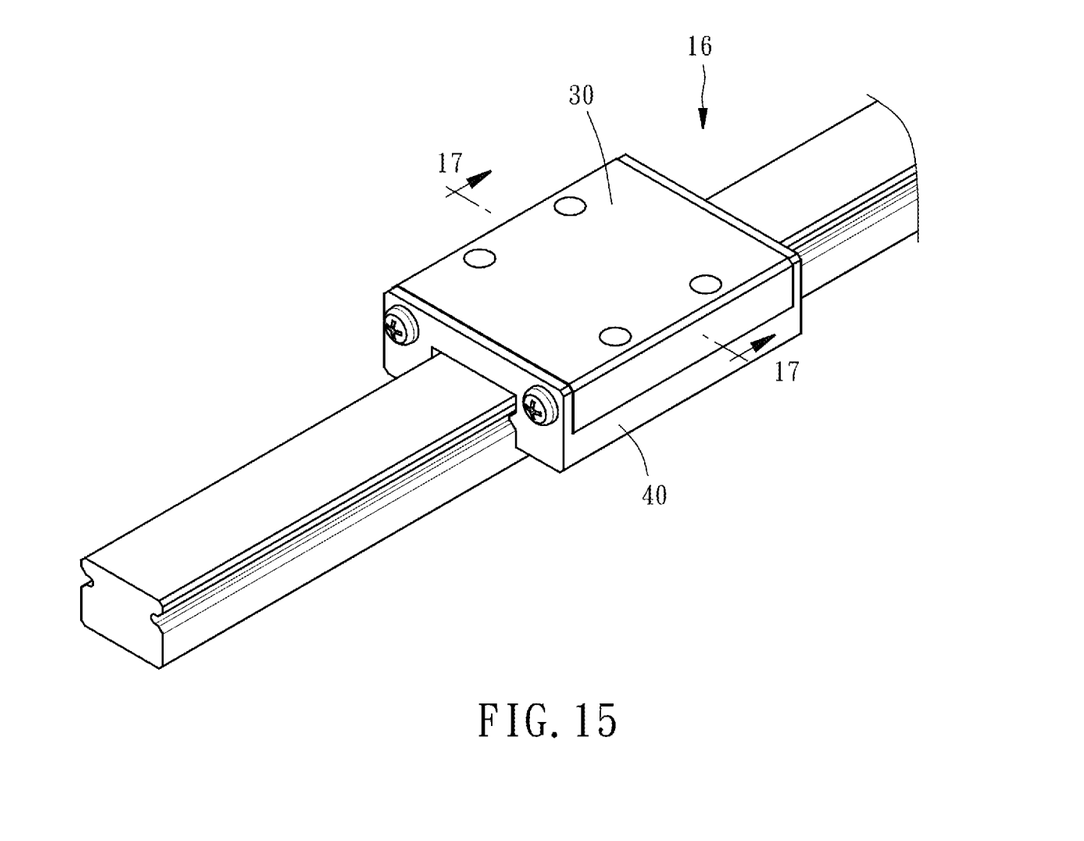
FIG. 15 is an elevational view of the linear guideway with lubricating structure of the fourth embodiment of the present invention.
Figure 16:
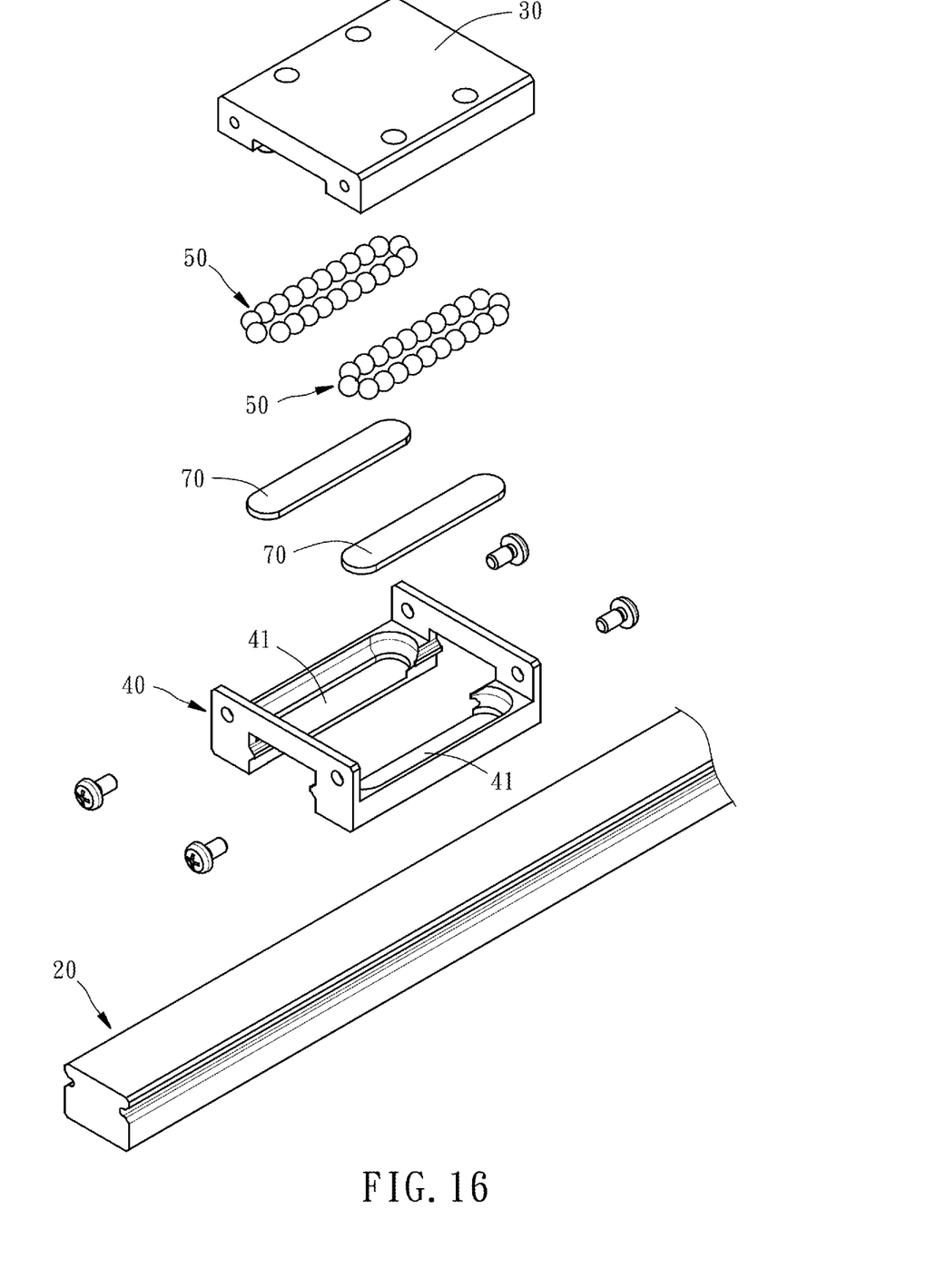
FIG. 16 is an exploded view of the linear guideway with lubricating structure of the fourth embodiment of the present invention.
Figure 17:
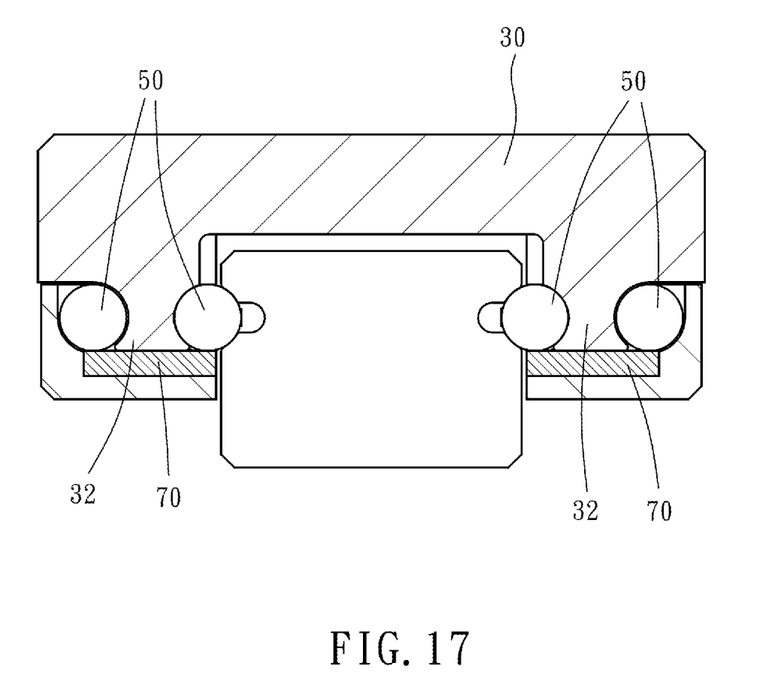
FIG. 17 is a sectional view taken along line 17-17 of FIG. 15.

Referring to FIG. 15 and FIG. 16, the linear guideway 16 with lubricating structure according to the fourth embodiment of the present invention. The main difference lies in the structure and installation position of the lubricating plates 70. In detail, the lubricating plates 70 have no socket grooves 62 in this embodiment, so they are not placed on the foot members 32 of the sliding block 30, but are placed directly in the receiving chambers 41 of the circulating member 40, as shown in FIG. 17, so that the lubricating plates 70 contact the bottom of the foot members 32 of the sliding block 30 with its top surface on the one hand, and contact the bottom of the balls 50 with its top surface on the other hand. Provide lubrication effect. This can also provide a lubricating effect to the balls 50.

In summary, the linear guideway 10, 12, 14, 16 with lubricating structure of the present invention hides the lubricating plates 60, 70 in the sliding block 30. Not only can the existing length of the sliding block 30 be maintained, the stroke of the sliding block 30 will not be affected, and it is quite suitable for use under short-stroke operating conditions. Moreover, the lubricating plates 60, 70 keep in contact with the top or bottom of the balls 50 during the operation of the balls 50. This can prevent the lubricating plates 60, 70 from generating a step difference on the running path of the balls 50, so that the running smoothness of the balls 50 can be kept stable and consistent, thereby achieving the purpose of the present invention.

What is claimed is:

1. A linear guideway with lubricating structure, comprising:
   a rail;
   a sliding block slidably installed on said rail, said sliding block comprising two foot members oppositely located on a bottom surface thereof, said foot members being located on two opposite sides of said rail;
   a circulating member slidably set on said rail and connected to said sliding block, so that said circulating member, said rail and each said foot member of said sliding block respectively form a respective circulation channel;
   two sets of balls, each set of said balls being set in one respective said circulation channel; and
   two lubricating plates respectively set adjacent to one respective said circulation channel and respectively contacting one respective said set of balls;
   wherein said lubricating plates selectively contact a top or a bottom of said balls;
   wherein said circulating member comprises positioning holes; each said lubricating plate comprises a positioning post plugged in one respective said positioning hole of said circulating member.

2. The linear guideway with lubricating structure as claimed in claim 1, wherein said lubricating plates contact the top of said balls and the bottom of said balls.

3. The linear guideway with lubricating structure as claimed in claim 1, wherein said circulating member further comprises two opposite receiving chambers; said lubricating plates are respectively set in said receiving chambers of said circulating member to contact the bottom of the respective said balls.

4. The linear guideway with lubricating structure as claimed in claim 1, wherein said rail comprises two parallel first rolling grooves; each said foot member of said sliding block comprises two parallel second rolling grooves and two opposite first return grooves, each said first return groove being connected to one end of each of said second rolling grooves; said circulating member comprises two opposite receiving chambers, two third rolling grooves and two opposite second return grooves around each of said two opposite receiving chambers, said second return grooves being connected to two ends of said third rolling groove; one said second rolling groove of each said foot member of said sliding block corresponds to one respective said first rolling groove of said rail, and the other said second rolling groove of each said foot member of said sliding block corresponds to one respective said third rolling groove of said circulating member, and said first return grooves of said foot members of said sliding block correspond to said second return grooves of said circulating member, so that one said first rolling groove, said second rolling grooves, one said third rolling groove, said first return grooves and said second return grooves together form one respective said circulation channel.

5. The linear guideway with lubricating structure as claimed in claim 1, wherein said rail comprises two parallel first rolling grooves; each said foot member of said sliding block comprises two parallel second rolling grooves; said circulating member comprises two opposite receiving chambers, two third rolling grooves, two opposite second return grooves and two opposite first half return portions set around each of said two opposite receiving chambers, said second return grooves being respectively connected to two ends of said third rolling groove, each said first half return portion being adjacent to one respective said second return groove; each said lubricating plate comprises a socket groove and two opposite second half return portions, each said second half return portion being adjacent to one end of said socket groove; one said second rolling groove of each said foot member of said sliding block corresponds to one respective said first rolling groove of said rail, the other said second rolling groove of each said foot member of said sliding block corresponds to one respective said third rolling groove of said circulating member, and said first half return portions of said circulating member are connected with said second half return portions of said lubricating plates to form a plurality of first return grooves; said first return grooves correspond to said second return grooves of said circulating member so that one said first rolling groove, said second rolling grooves, one said third rolling grooves, said first return grooves and said second return grooves together form one respective said circulation channel.

6. The linear guideway with lubricating structure as claimed in claim 1, wherein each said lubricating plate is made of a porous material.

7. The linear guideway with lubricating structure as claimed in claim 1, wherein each said lubricating plate comprises a socket groove, and each said lubricating plate is sleeved on one respective said foot member of said sliding block with the said socket groove thereof.

8. The linear guideway with lubricating structure as claimed in claim 7, wherein each said lubricating plate further comprises a covering portion adjacent to said socket groove, and each said lubricating plate covers a part of the respective said set of balls with said covering portion.

* * * * *